United States Patent
Bear et al.

(10) Patent No.: US 7,577,429 B2
(45) Date of Patent: *Aug. 18, 2009

(54) REAL-TIME COMMUNICATIONS ARCHITECTURE AND METHODS FOR USE WITH A PERSONAL COMPUTER SYSTEM

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Dale C. Crosier, Kirkland, WA (US); Robert Scott Plank, Bellevue, WA (US); Michael W. Van Flandern, Seattle, WA (US); Pasquale DeMaio, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,302

(22) Filed: Aug. 10, 2007

(65) Prior Publication Data

US 2008/0037741 A1 Feb. 14, 2008

Related U.S. Application Data

(62) Division of application No. 10/429,905, filed on May 5, 2003, now abandoned.

(51) Int. Cl.
*H04W 4/00* (2009.01)
*H04M 11/00* (2006.01)
(52) U.S. Cl. ............... 455/426.1; 379/90.01; 379/93.07
(58) Field of Classification Search ............... 455/426.1; 379/90.01, 93.07
See application file for complete search history.

(56) References Cited

U.S. PATENT DOCUMENTS 4,860,342 A 8/1989 Danner (Continued)

FOREIGN PATENT DOCUMENTS

EP 0772327 A2 5/1997

(Continued)

OTHER PUBLICATIONS

U.S. Appl. No. 11/509,437, "Method and System for Auxiliary Display of Information for a Computing Device", filed Aug. 23, 2006, Eric Gould Bear, et al.

(Continued)

*Primary Examiner*—Barry W Taylor
(74) *Attorney, Agent, or Firm*—Workman Nydegger

(57) ABSTRACT

A system and method for improved real-time communications in a computer system that eliminates the distinctions between various communication devices, communication channels and types of communication, including voice, text and video, is provided. When connected for communication, the user may easily move between modalities, including switching devices on which the user is communicating, switching networks, and transitioning between types of communication. A computer system includes various integrated communications-related devices, and a controller controls those devices based on user actions entered via buttons or user interface software and provides notifications to the user. The user is able to input data via any appropriate input mechanism, and receive data on any suitable output mechanism. Improved non-linear caller ID navigation is also provided.

20 Claims, 12 Drawing Sheets

U.S. PATENT DOCUMENTS

| | | |
|---|---|---|
| 5,159,445 A | 10/1992 | Gitlin |
| 5,412,417 A | 5/1995 | Tozuka |
| 5,487,181 A | 1/1996 | Dailey |
| 5,491,800 A | 2/1996 | Goldsmith |
| 5,519,772 A | 5/1996 | Akman et al. |
| 5,533,115 A | 7/1996 | Hollenbach |
| 5,546,538 A | 8/1996 | Cobbley |
| 5,568,540 A | 10/1996 | Grecko |
| 5,657,414 A | 8/1997 | Lett |
| 5,675,374 A | 10/1997 | Kohda |
| 5,675,810 A | 10/1997 | Sellers |
| 5,764,901 A | 6/1998 | Skarbo |
| 5,768,164 A | 6/1998 | Hollon, Jr. |
| 5,802,305 A | 9/1998 | McKaughan |
| 5,907,604 A | 5/1999 | Hsu |
| 5,959,622 A | 9/1999 | Greer |
| 5,991,836 A | 11/1999 | Renda |
| 5,999,613 A | 12/1999 | Nabkel |
| 6,006,285 A | 12/1999 | Jacobs |
| 6,052,442 A | 4/2000 | Cooper |
| 6,101,610 A | 8/2000 | Beebe |
| 6,144,363 A | 11/2000 | Alloul |
| 6,144,644 A | 11/2000 | Bajzath |
| 6,172,703 B1 | 1/2001 | Lee |
| 6,208,373 B1 | 3/2001 | Fong |
| 6,215,420 B1 | 4/2001 | Harrison |
| 6,237,846 B1 | 5/2001 | Lowell |
| 6,240,168 B1 * | 5/2001 | Stanford et al. ........ 379/110.01 |
| 6,266,714 B1 | 7/2001 | Jacobs |
| 6,279,056 B1 | 8/2001 | Jacobs |
| 6,282,435 B1 | 8/2001 | Wagner et al. |
| 6,346,934 B1 | 2/2002 | Wugofski |
| 6,362,440 B1 | 3/2002 | Karidis |
| 6,380,968 B1 | 4/2002 | Alexander |
| 6,390,371 B1 | 5/2002 | Armga |
| 6,417,849 B2 | 7/2002 | Lefebvre |
| 6,438,216 B1 * | 8/2002 | Aktas ...................... 379/88.01 |
| 6,438,585 B2 | 8/2002 | Mousseau |
| 6,453,027 B1 | 9/2002 | Kang |
| 6,483,905 B1 | 11/2002 | Kikinis |
| 6,484,019 B1 | 11/2002 | Aklian |
| 6,496,860 B2 | 12/2002 | Ludtke |
| 6,507,356 B1 | 1/2003 | Jackel |
| 6,513,128 B1 | 1/2003 | Wang |
| 6,516,356 B1 | 2/2003 | Belknap et al. |
| 6,518,957 B1 | 2/2003 | Lehtinen |
| 6,519,335 B1 | 2/2003 | Bushnell |
| 6,546,262 B1 | 4/2003 | Freadman |
| 6,603,855 B1 | 8/2003 | Cannon |
| 6,628,194 B1 | 9/2003 | Hellebust |
| 6,628,267 B2 | 9/2003 | Karidis |
| 6,658,095 B1 | 12/2003 | Yoakum |
| 6,671,356 B2 | 12/2003 | Lewis |
| 6,671,743 B1 | 12/2003 | Verity |
| 6,674,457 B1 | 1/2004 | Davies |
| 6,680,845 B2 | 1/2004 | Agata |
| 6,691,233 B1 | 2/2004 | Gannage |
| 6,718,183 B1 | 4/2004 | Blust |
| 6,731,316 B2 | 5/2004 | Herigstad |
| 6,732,365 B2 | 5/2004 | Belknap |
| 6,741,232 B1 | 5/2004 | Siedlikowski |
| 6,757,372 B1 | 6/2004 | Dunlap |
| 6,806,867 B1 | 10/2004 | Arruda |
| 6,816,881 B1 | 11/2004 | Mohindra |
| 6,819,961 B2 | 11/2004 | Jacobs |
| 6,831,657 B2 | 12/2004 | Tsutsumi |
| 6,882,326 B2 | 4/2005 | Hirayama |
| 6,888,562 B2 | 5/2005 | Rambo |
| 6,892,074 B2 | 5/2005 | Tarkiainen |
| 6,897,851 B2 | 5/2005 | Carini |
| 6,902,332 B2 | 6/2005 | McLoone |
| 6,912,283 B2 | 6/2005 | Meyerson |
| 6,918,123 B1 | 7/2005 | Shteyn |
| 6,937,950 B2 | 8/2005 | Cragun |
| 6,938,174 B2 | 8/2005 | LeKuch |
| 6,970,556 B2 | 11/2005 | Wall |
| 6,973,167 B2 | 12/2005 | Kikinis |
| 6,976,216 B1 | 12/2005 | Peskin |
| 6,980,641 B1 | 12/2005 | Stanford |
| 6,996,445 B1 | 2/2006 | Kamijo |
| 7,000,237 B1 | 2/2006 | Sinha |
| 7,036,110 B2 | 4/2006 | Jeyaraman |
| 7,096,391 B2 | 8/2006 | Johnson |
| 7,123,370 B2 | 10/2006 | Watanabe |
| 7,221,331 B2 | 5/2007 | Bear |
| 7,231,229 B1 | 6/2007 | Hawkins |
| 7,243,130 B2 | 7/2007 | Horvitz |
| 7,272,660 B1 | 9/2007 | Powers |
| 7,292,588 B2 | 11/2007 | Milley |
| 7,302,637 B1 | 11/2007 | Maguire |
| 7,401,053 B2 | 7/2008 | Kaminnura |
| 2001/0040551 A1 | 11/2001 | Yates |
| 2002/0004855 A1 | 1/2002 | Cox |
| 2002/0015020 A1 | 2/2002 | Mobin |
| 2002/0080967 A1 | 6/2002 | Abdo |
| 2002/0087225 A1 | 7/2002 | Howard |
| 2002/0099456 A1 | 7/2002 | McLean |
| 2002/0114430 A1 * | 8/2002 | Murata ..................... 379/88.17 |
| 2002/0131072 A1 | 9/2002 | Jackson |
| 2002/0167458 A1 | 11/2002 | Baudisch |
| 2002/0167460 A1 | 11/2002 | Baudisch |
| 2003/0021290 A1 | 1/2003 | Jones |
| 2003/0025674 A1 | 2/2003 | Watanabe |
| 2003/0037180 A1 | 2/2003 | Madineni |
| 2003/0046448 A1 | 3/2003 | Fischer |
| 2003/0069689 A1 | 4/2003 | Ihara |
| 2003/0074590 A1 | 4/2003 | Fogle |
| 2003/0112325 A1 | 6/2003 | Boyden |
| 2003/0118003 A1 * | 6/2003 | Geck et al. .................. 370/352 |
| 2003/0122874 A1 | 7/2003 | Dieberger |
| 2003/0131148 A1 | 7/2003 | Kelley |
| 2003/0146903 A1 | 8/2003 | Yi |
| 2003/0188041 A1 | 10/2003 | Fillmore |
| 2003/0197685 A1 | 10/2003 | Yi |
| 2003/0227471 A1 | 12/2003 | Eglit |
| 2004/0103144 A1 | 5/2004 | Sallam |
| 2004/0114032 A1 | 6/2004 | Kakii |
| 2004/0135819 A1 | 7/2004 | Maa |
| 2004/0141012 A1 | 7/2004 | Tootill |
| 2004/0155956 A1 | 8/2004 | Libbey |
| 2004/0177361 A1 | 9/2004 | Bernhard |
| 2004/0210628 A1 | 10/2004 | Inkinen |
| 2004/0222978 A1 | 11/2004 | Bear |
| 2004/0223058 A1 | 11/2004 | Richter |
| 2004/0240167 A1 | 12/2004 | Ledbetter |
| 2005/0068423 A1 | 3/2005 | Bear |
| 2005/0069101 A1 | 3/2005 | Bear |
| 2005/0071437 A1 | 3/2005 | Bear |
| 2005/0071626 A1 | 3/2005 | Bear |
| 2005/0182822 A1 | 8/2005 | Daniel |
| 2005/0186942 A1 | 8/2005 | Griffin |
| 2005/0193396 A1 | 9/2005 | Stafford-Fraser |
| 2005/0259032 A1 | 11/2005 | Morris |
| 2005/0262302 A1 | 11/2005 | Fuller |
| 2006/0007051 A1 | 1/2006 | Bear |
| 2006/0048062 A1 | 3/2006 | Adamson |
| 2006/0061516 A1 | 3/2006 | Campbell |
| 2006/0095525 A1 | 5/2006 | Mousseau |
| 2006/0130075 A1 | 6/2006 | Rhoten |
| 2006/0164324 A1 | 7/2006 | Polivy |
| 2006/0284787 A1 | 12/2006 | Bear |

| | | |
|---|---|---|
| 2007/0071257 A1 | 3/2007 | Bear |
| 2007/0150719 A1 | 6/2007 | Bear |

FOREIGN PATENT DOCUMENTS

| | | |
|---|---|---|
| EP | 0777394 A1 | 6/1997 |
| EP | 000816990 | 1/1998 |
| EP | 0838934 A1 | 4/1998 |
| EP | 0772327 A3 | 2/1999 |
| WO | WO9602049 A1 | 1/1996 |
| WO | 03/085960 | 10/2003 |

OTHER PUBLICATIONS

U.S. Appl. No. 11/559,821, Method and System for Unified Audio Control on a Personal Computer, filed Nov. 14, 2006, Eric Gould Bear, et al.
U.S. Appl. No. 11/685,014, "Method and System for Unified Audio Control on a Personal Computer", filed Feb. 12, 2007, Eric Gould Bear, et al.
Anonymous, International Search Report in Corresponding EP Application No. EP 04 00 9868, Aug. 2004.
Office Action dated Oct. 15, 2008 cited in U.S. Appl. No. 11/509,437.
Office Action dated Oct. 20, 2008 cited in U.S. Appl. No. 11/509,431.
Office Action dated Nov. 6, 2008 cited in U.S. Appl. No. 10/996,557.
Office Action dated Oct. 1, 2008 cited in U.S. Appl. No. 10/996,371.
U.S. Appl. No. 11/837,302, filed Aug. 10, 2007, Bear.
Office Action dated Sep. 24, 2007 cited in related U.S Appl. No. 10/429,933.
Office Action dated Feb. 15, 2008 cited in related U.S Appl. No. 10/429,933.
Notice of Allowance dated Jan. 30, 2008 cited in related U.S. Appl. No. 10/429,931.
Office Action dated Mar. 21, 2008 cited in related U.S. Appl. No. 10/966,557.
Office Action dated Feb. 28, 2008 cited in related U.S. Appl. No. 10/966,371.
Office Action dated Sep. 28, 2007 cited in related U.S. Appl. No. 10/429,943.
Office Action dated Mar. 26, 2008 cited in related U.S. Appl. No. 10/428,943.
Office Action dated Mar. 18, 2008 cited in related U.S. Appl. No. 10/677,118.
Office Action dated Oct. 15, 2007 cited in related U.S. Appl. No. 10/429,903.
Notice of Allowance dated Apr. 2, 2008 cited in related U.S. Appl. No. 10/429,903.
Notice of Allowance dated Apr. 23, 2008 cited in related U.S. Appl. No. 10/430,369.
Office Action dated Jan. 11, 2008 cited in related U.S. Appl. No. 10/677,084.
Notice of Allowance dated Apr. 29, 2008 cited in related U.S. Appl. No. 10/677,084.
Oxford on-line dictionary, http://dictionary.oed.com/entrance.dtl, Oxford University Press 2007, on the definition of the woed "physical" under III/7b, Jun. 2007.
OA mailed Aug. 8, 2007 cited in related case U.S. Appl. No. 10/996,371.
OA mailed Jul. 31, 2007 cited in related case U.S. Appl. No. 10/677,084.
OA mailed Jul. 27, 2007 cited in related case U.S. Appl. No. 10/996,557.
OA mailed Jul. 30, 2007 cited in related case U.S. Appl. No. 10/430,369.
OA mailed Jul. 6, 2007 cited in related case U.S. Appl. No. 10/429,943.
NOA mailed Sep. 7, 2007 cited in related case U.S. Appl. No. 10/429,931.
Office Action dated Aug. 6, 2008 cited in U.S. Appl. No. 10/429,943.
Office Action dated Aug. 20, 2006 cited in U.S. Appl. No. 10/429,933.
Office Action dated Feb. 14, 2007 cited in U.S. Appl. No. 10/429,905.
Office Action dated May 21, 2007 cited in U.S. Appl. No. 10/429,905.
Office Action dated Apr. 4, 2006 cited in U.S. Appl. No. 10/429,930.
Office Action dated Jul. 14, 2006 cited in U.S. Appl. No. 10/429,930.
Office Action dated Nov. 14, 2006 cited in U.S. Appl. No. 10/429,930.
Notice of Allowance dated Mar. 16, 2007 cited in U.S. Appl. No. 10/429,930.
Office Action dated Aug. 9, 2005 cited in U.S. Appl. No. 10/429,932.
Office Action dated Oct. 4, 2005 cited in U.S. Appl. No. 10/429,932.
Office Action dated Mar. 17, 2006 cited in U.S. Appl. No. 10/429,932.
Office Action dated Aug. 15, 2006 cited in U.S. Appl. No. 10/429,932.
Notice of Allowance dated Jan. 25, 2007 cited in U.S. Appl. No. 10/429,932.
Office Action dated Mar. 16, 2006 cited in U.S. Appl. No. 10/677,101.
Office Action dated Sep. 6, 2006 cited in U.S. Appl. No. 10/677,101.
Notice of Allowance dated Feb. 2, 2006 cited in U.S. Appl. No. 10/677,101.
Office Action dated Mar. 26, 2007 cited in U.S. Appl. No. 10/429,931.
Office Action dated Sep. 26, 2006 cited in U.S. Appl. No. 10/430,369.
Office Action dated Mar. 20, 2007 cited in U.S. Appl. No. 10/430,369.
Office Action dated Jan. 3, 2007 cited in U.S. Appl. No. 10/429,903.
Office Action dated Feb. 6, 2007 cited in U.S. Appl. No. 10/429,943.
Office Action dated Jul. 6, 2007 cited in U.S. Appl. No. 10/429,943.
Office Action dated Mar. 6, 2007 cited in U.S. Appl. No. 10/429,933.
Office Action dated Aug. 10, 2005 cited in U.S. Appl. No. 10/677,084.
Office Action dated Jan. 19, 2006 cited in U.S. Appl. No. 10/677,084.
Office Action dated Nov. 1, 2006 cited in U.S. Appl. No. 10/677,084.
Office Action dated Nov. 28, 2008 cited in U.S. Appl. No. 10/677,118 (Copy Attached).
Office Action dated Feb. 19, 2009 cited in U.S. Appl. No. 10/996,558 (Copy Attached).
Notice of Allowance dated Feb. 6, 2009 cited in U.S. Appl. No. 10/429,943 (Copy Attached).
Office Action dated Feb. 20, 2009 cited in U.S. Appl. No. 11/053,186 (Copy Attached).

* cited by examiner

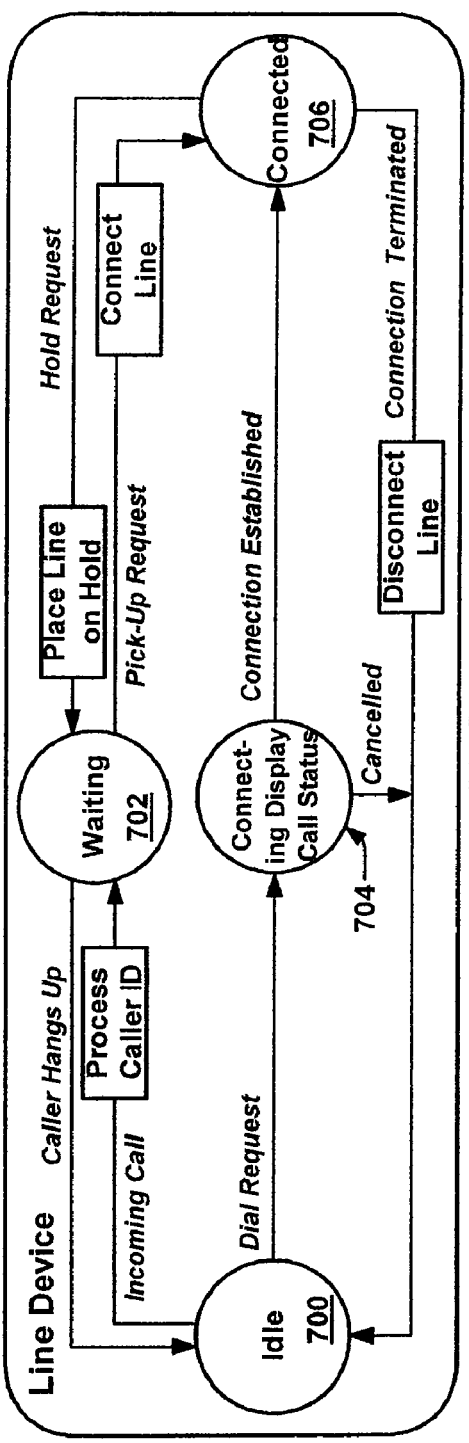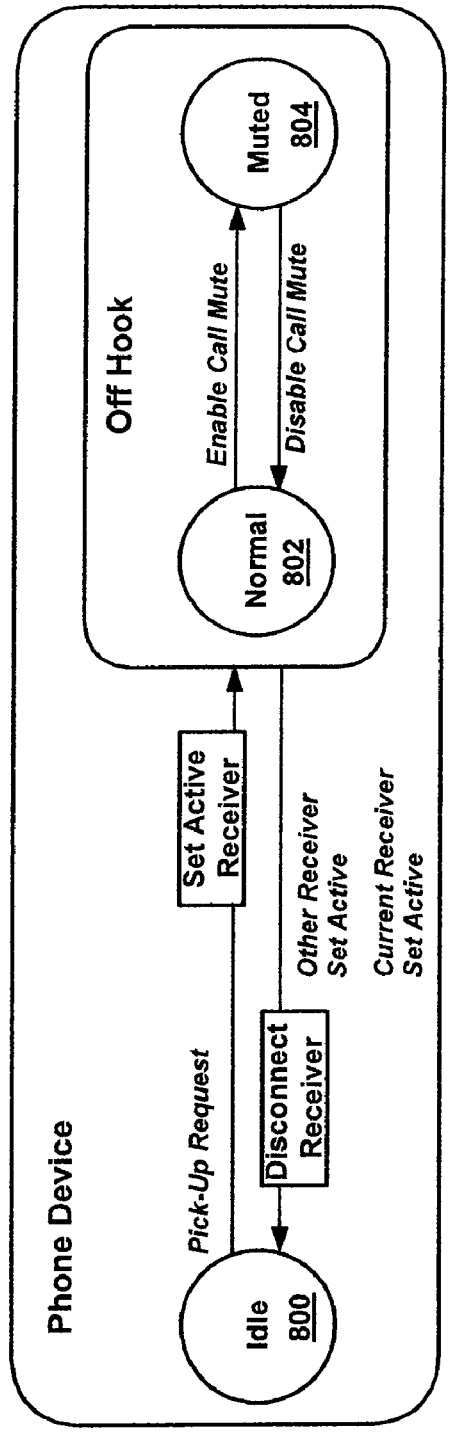
FIG. 7
FIG. 8

FIG. 16

| Calls: | Time Connected: | Total Time: | Type: |
|---|---|---|---|
| J. Smith 555-1234 | 00:04:25 | 00:05:18 | Voice, Video IN&OUT, IM |
| Unknown Name, Unknown Number | 00:01:15 | 00:04:25 | Voice |
| Out Of Area | 00:00:08 | 00:01:18 | Voice, Video OUT, IM |
| Fred Johansson | 00:00:11 | 00:00:57 | IM, Video IN |

FIG. 17

| Calls: | Time Connected: | Total Time: | Type: |
|---|---|---|---|
| J. Smith 555-1234 | 00:05:25 | 00:06:18 | Voice, Video IN&OUT, IM |
| Unknown Name, Unknown Number | 00:01:15 | 00:05:25 | Voice |
| Out Of Area | 00:00:08 | 00:02:18 | Voice, Video OUT, IM |
| Fred Johansson | 00:00:11 | 00:01:57 | IM, Video IN |

REAL-TIME COMMUNICATIONS ARCHITECTURE AND METHODS FOR USE WITH A PERSONAL COMPUTER SYSTEM

CROSS-REFERENCE TO RELATED APPLICATIONS

This is a divisional application of U.S. patent application Ser. No. 10/429,905 filed May 5, 2003 now abandoned, and entitled Real-Time Communications Architecture And Methods For Use With A Personal Computer System which is incorporated herein by reference in its entirety. That application is related to the following copending United States Patent Applications, assigned to the assignee of the present invention, and hereby incorporated by reference in their entireties:

U.S. patent application Ser. No. 10/429,932 filed May 5, 2003, and entitled "Method and System for Auxiliary Display of Information for a Computing Device,";

U.S. patent application Ser. No. 10/429,904 filed May 5, 2003, and entitled "Record Button on a Computer System,";

U.S. patent application Ser. No. 10/429,930 filed May 5, 2003, and entitled "Method and System for Auxiliary Processing Of Information for a Computing Device,";

U.S. patent application Ser. No. 10/430,369 filed May 5, 2003, and entitled "System and Method for Activating a Computer System,";

U.S. patent application Ser. No. 10/429,903 filed May 5, 2003, and entitled "Computer System with Do Not Disturb System and Method,";

U.S. patent application Ser. No. 10/429,943 filed May 5, 2003, and entitled "Computer Camera System and Method for Reducing Parallax,";

U.S. patent application Ser. No. 10/429,933 filed May 5, 2003, and entitled "Control and Communications Panel for a Computer System,"; and U.S. patent application Ser. No. 10/429,931 filed May 5, 2003, and entitled "Notification Lights, Locations and Rules for a Computer System.".

BACKGROUND OF THE INVENTION

1. The Field of the Invention

The invention relates generally to communications and computer systems.

2. Background of the Invention

People communicate in many ways over many types of devices and channels, including by voice, by audio/video, and by text or the like. Voice communications include audio over landline telephones such as connected to POTS (plain old telephone service) lines or PBX (private branch exchange) lines, and cellular and satellite telephones, as well as voice over Internet Protocol (VoIP). Audiovisual communications include video tele-conference (VTC), which also may be Internet Protocol-based communication. Text communications include electronic mail, instant messaging, pagers with text messaging, and so forth.

Some contemporary devices provide multiple ways to communicate, e.g., pocket sized personal computers may have a cellular telephone connection to place audio calls, and a wireless internet connection for sending and receiving electronic mail messages and instant messaging communications. Some mobile devices (e.g., a Smartphone) are considered to be more like telephones, but likewise provide Internet access, and may handle text messaging generally.

While all of these technologies are fairly easy to use, from the user's perspective there is still a substantial emphasis on the communication channels and protocols, and the devices themselves, rather than on what is really important to the user, which is communicating with someone else over an available device. For example, a user who needs to talk to someone else may need to consider many factors before selecting a device and attempting to call the other person, such as whether to use a landline phone or a mobile telephone, e.g., because the call may take a long time, part of which could be spent while traveling. Other factors that a user may consider include the other device that the caller should be calling (whether to call the recipient's landline telephone or mobile telephone), the cost of the call, whether the call should be a video call, and so forth. Each of the devices in turn has its own idiosyncrasies, such as a custom user interface, a different set of stored numbers from those stored in other devices, and so forth.

What is needed is an automated architecture (system) and related methods for hiding much of the device and connection considerations from users, and replacing those considerations with a model that focuses on the user's real time communication with one or more other users. The method and system should be flexible and extensible to handle many user scenarios and usage patterns, yet straightforward for users to implement.

SUMMARY OF THE INVENTION

Briefly, the present invention provides a system and method for improved real-time communications leveraging a personal computer and/or other processing resources, in which the boundaries between various devices and communication channels are blurred, as are the boundaries between types of communication, including voice, text and video. The channel on which an incoming call is being received, as well as the device on which the call may be answered, are made significantly less important to the user than the fact that a call is coming in from another party. Outgoing calls focus on connecting to the called party, rather than any particular device.

When connected, the user may easily move between modalities, including switching devices on which the user is communicating, and transitioning between types of communication. For example, two or more users may connect with voice only communication, and then, with relatively little effort, one or more may move to voice and video. One or more users may employ instant messaging (IM) or similar text communication, such as to enhance an existing connection, or to avoid receiving a voice call but still respond in some manner.

To provide such real-time communications functionalities, a computer system includes various integrated communications-related devices, such as an attached camera, an attached telephone handset, and an attached speaker and microphone, which may function as a speakerphone. Other devices include mobile communications devices such as a cellular telephone or other mobile computing device. An auxiliary display device such as for displaying caller ID data is coupled to the computer, but may remain functional when the computer operating system is not running. Buttons related to controlling real-time communications, and indicators related to the state of real-time communications are also provided.

The present invention provides a real-time communications architecture including a controller comprising software that facilitating communications in general, switches communications to and from appropriate devices, and/or transitions communications among the various communications channels and/or types of communications. For example, the real-time communications controller couples the communication devices to voice over IP, video, POTS, PBX, cellular networks and virtually any communications medium. The devices may be wired to the computer system to which the real-time communications controller software is running, or may be wireless, e.g., Bluetooth™ based devices. The user may interact with the real-time communications controller through user interface software of one or more programs, and/or user interface software of the real-time communications controller, but in one implementation, may also do so without running user interface software. To this end, the real-time communication control buttons are easy to use and understand, and along with the indicators are positioned at locations that intuitively facilitate interaction with the real-time communications controller.

In general, the user is able to input data via any input mechanism, e.g., any microphone on any device, via any text or pointing-based user data entry mechanism such as the keyboard and/or mouse, and/or the camera. Similarly, the real-time communications controller is able to receive data and output appropriate data to the user on any of the output mechanisms when activated, such as the speaker of a speakerphone, the handset telephone, a headset, the mobile phone or similar computing device, a PBX phone and/or a network card. Video, graphical and/or text information can also be displayed on the main display and/or the auxiliary display when available.

By responding to the user's actions, mode control logic in the real-time communications controller follows various real-time communication rules and user-configured settings to handle a user's communication needs, and in one implementation, can do so when the computer system is otherwise powered down. The mode control logic also appropriately responds to external events, such as incoming calls, pages, text messages, forwarded voicemail messages, and so forth. User actions may comprise lifting or replacing the attached handset, typing and pointing-and-clicking a mouse or the like into a user interface, pressing phone controls buttons, issuing voice commands, and so forth.

The real-time communications controller also follows various real-time communication rules and user-configured settings to handle incoming calls in a manner that matches a user's communication needs. For example, for an incoming call, the mode control logic will display the caller ID information, sound a ring or call waiting tone on the speaker as appropriate, and respond to a user action such as selection of a device to answer the call by routing the voice, text and/or video as appropriate. Any other audio may be automatically muted until no calls remain.

The present invention allows a user to switch devices, transition between communication channels, and transition between types of calls. Thus, for example, a user can answer a cellular phone call via the headset, handset or speakerphone, add video to a call when available, switch a POTS call to a cell-phone carrier, and vice-versa.

Improved caller ID navigation is also provided, in which a user can switch among parties on hold, and also conference in multiple parties, in a non-linear manner. A user can use any active display device such as the auxiliary display to perform such operations.

Other advantages will become apparent from the following detailed description when taken in conjunction with the drawings, in which:

BRIEF DESCRIPTION OF THE DRAWINGS

FIG. 7 is a state diagram generally representing a line device object and related operation in accordance with an aspect of the present invention;

FIG. 8 is a state diagram generally representing a phone device object and related operation in accordance with an aspect of the present invention;

FIGS. 16 and 17 are representations of an example display which allows non-linear conferencing of calls displayed based on caller ID information.

DETAILED DESCRIPTION OF THE PREFERRED EMBODIMENTS

Exemplary Operating Environment

Figure 1:
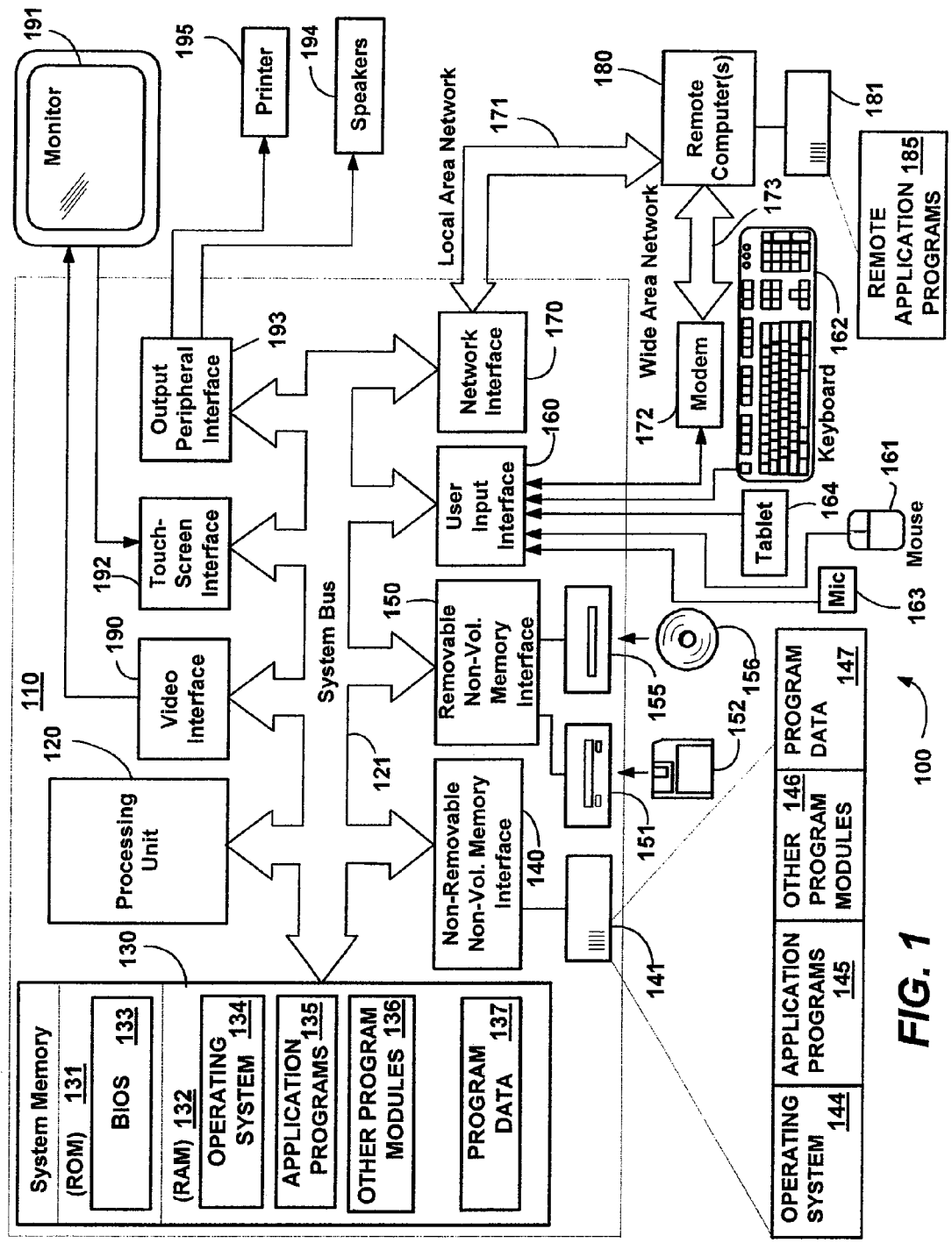
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Real Time Communications Modality Blurring

The present invention is generally directed towards blurring various communications modalities, such that a user communicates with one or more other users typically without having to deal with the connection channel or any particular device considerations. For example, audio, video and text communications will be initiated by the user using any suitable device that the user has available and wants to use, regardless of the channel (or channels) on which the communication ultimately occurs. Similarly, received communications can be handled by any appropriate device that the user selects. As will be understood, the various channels, devices and scenarios described herein are only examples, and there are many others to which the present invention will apply.

Figure 2:
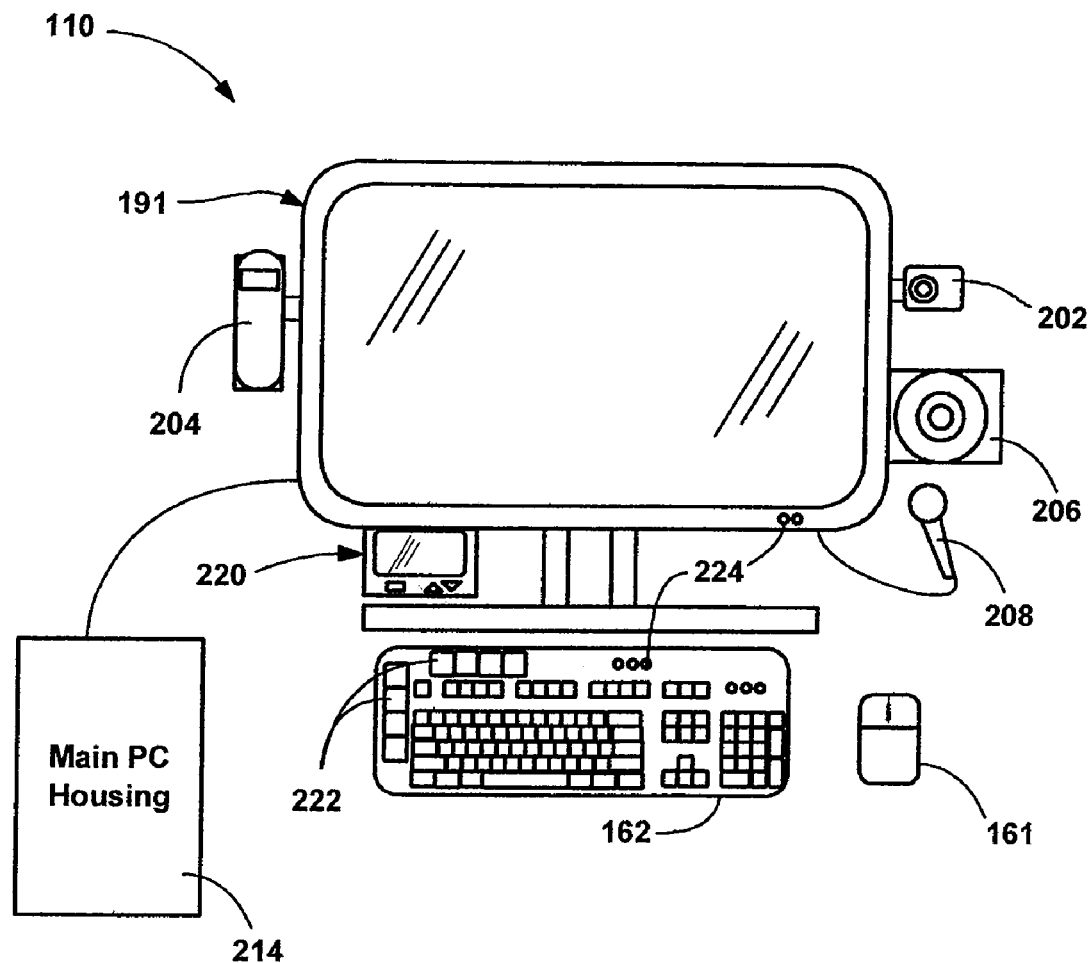
FIG. 2 is a general representation of a computer system arranged with communications-related mechanism in accordance with an aspect of the present invention.

Turning to FIG. 2 of the drawings, there is shown a computer system, such as the computer system 110 of FIG. 1, in which various communications-related devices are integrated. For example, the computer system 110 includes a monitor 191 having an attached camera 202, an attached telephone (e.g., handset) 204, and an attached speaker 206, which along with a microphone 208, may function as a speakerphone. Other devices not separately represented in FIG. 2 include mobile communications devices such as a cellular telephone or other mobile computing device capable of connecting in some way (e.g., by wired cradle or Bluetooth™ technology) with the computer system. Although shown as individual devices in FIG. 2, it is understood that any or all of these devices, such as the speaker 206 and microphone 208, may be combined into a unitary assembly, or built into other devices, such as the monitor 191. In any event, each of these devices may be present and if so are connected directly or indirectly by a wired or wireless connection to interfaces at the main PC housing 214 (containing at least the motherboard, but also typically containing some non-volatile storage).

Also represented in FIG. 2 is an auxiliary display device 220, such as for displaying caller ID data or like information as described below. The auxiliary display is typically small (relative to the main display screen 191), and may be the display of another device, such as the screen of a mobile computing device, but may also be a dedicated display, such as one that is operably connected or coupled to the computer operating system when the computer system 110 is in a powered-up state. The auxiliary display may comprise a simple text display, such as a two-line display or the like. Further, note that the auxiliary display need not be an actual display, but can be a projection (e.g., onto a wall) of the information. As will become apparent below, the auxiliary display device 220 may provide some of its own processing and storage resources, so as to remain functional to some extent when the computer operating system is not running. In one alternative implementation described below, the auxiliary display device 220 includes control buttons or the like thereon for interacting with that display 220, and possibly with the computer system 110 in general, as described below. The keyboard 162 and/or monitor 191 (and/or possibly the pointing device 161) may also include non-conventional buttons 222, such as buttons related to controlling real-time communications, and non-conventional LED indicators 224, such as indicators related to the state of real-time communications.

Figure 3:
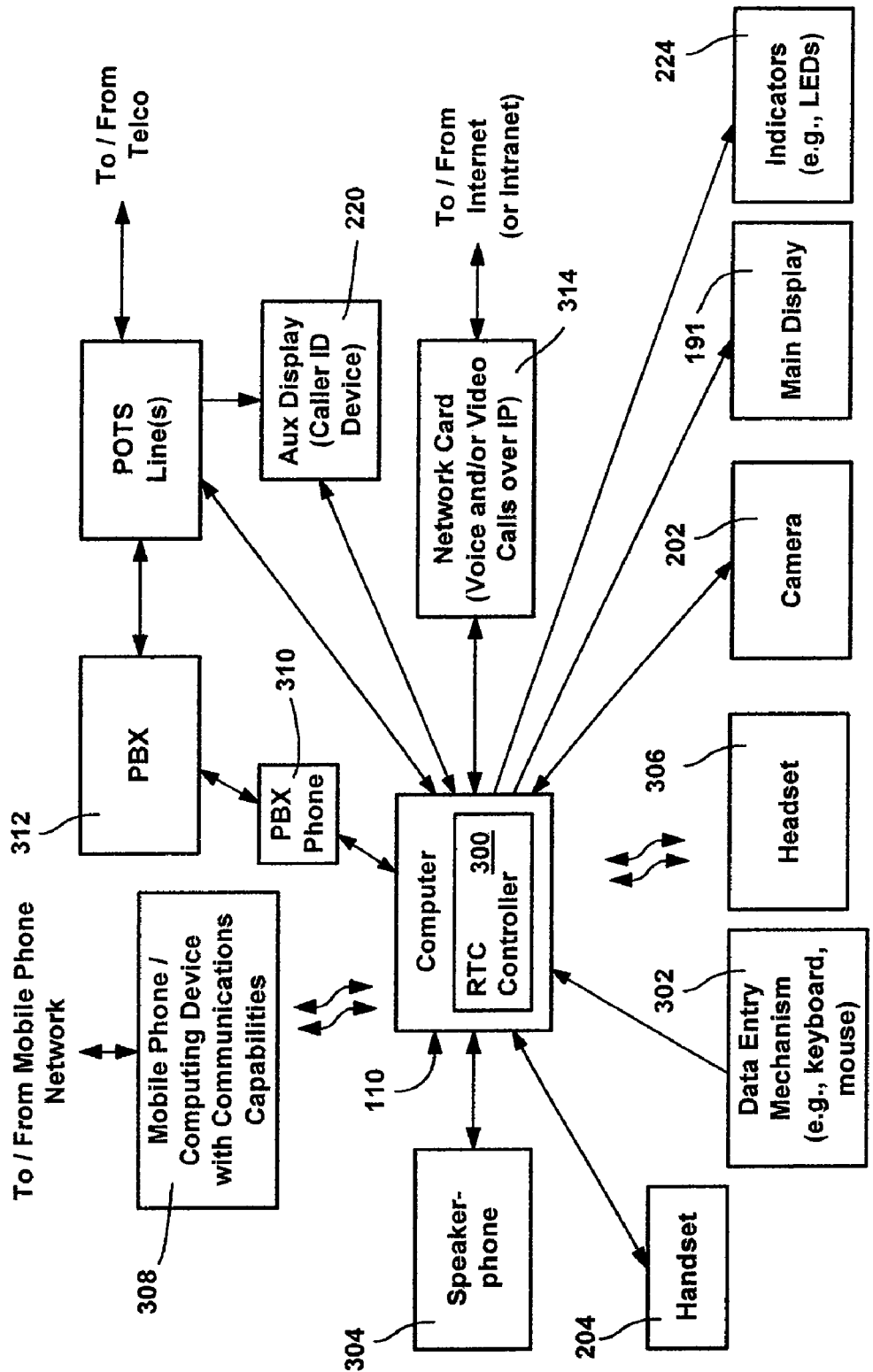
FIG. 3 is a block diagram generally representing the central control of communication devices and connections to communications channels, in accordance with an aspect of the present invention.

In accordance with an aspect of the present invention, as generally represented in FIG. 3, the computer system 110 includes, a real-time communications controller 300, primarily implemented in a software component or set of software components, that intelligently handles various aspects of a user's real-time communication needs, including facilitating communications in general, switching communications to and from appropriate devices, and/or transitioning communications among the various communications channels and/or types of communication. Note that the real-time communications controller 300 need not be built into the computer system 110, but can connect thereto as an add-on device, such as via a USB connection.

To handle a user's various communications needs, the real-time communications controller 300 allows a user to connect to various communication channels (e.g., a telephone company switching network, a mobile phone network, the internet or an intranet, and virtually any other local area or wide area network over which communication is possible) using the various communications-related data input/output devices. In general, the user is able to input data via any input mechanism, e.g., any microphone on any device, via any text or pointing-based user data entry mechanism 302 such as the keyboard and/or mouse, and/or the camera 202, and have that data configured as appropriate (e.g., converted from speech to text) and sent to an appropriate (one or possibly more) of the available communication channels. Similarly, the real-time communications controller 300 is able to receive data and output appropriate data to the user on any one or more of the output mechanisms, such as the speaker of a speakerphone 304 when the user has selected that device, the handset telephone 204 when lifted, a headset 306 if activated, the mobile phone or similar computing device 308 if selected, a PBX phone 310 connected to a PBX mechanism 312 and/or a network card 314. When video, graphical and/or text information is available, data can also be displayed on the main display 191 (if active), and/or the auxiliary display 220. Note that some of the devices are represented in FIG. 3 as directly connected (coupled) to the computer system while other are shown as being wireless, however it is understood that any device may be wired or wireless, e.g., a typical mobile computing device or mobile telephone may be cradled and thus "wired" to the computer, and/or may integrate a cellular phone, Wireless Ethernet (also known as 802.11b or Wi-Fi), and/or Bluetooth™ wireless technology. Further, any "connection" referred to herein and the like should be considered equivalent to a "coupling," whether directly or indirectly connected through any type of intermediary.

Figure 4:
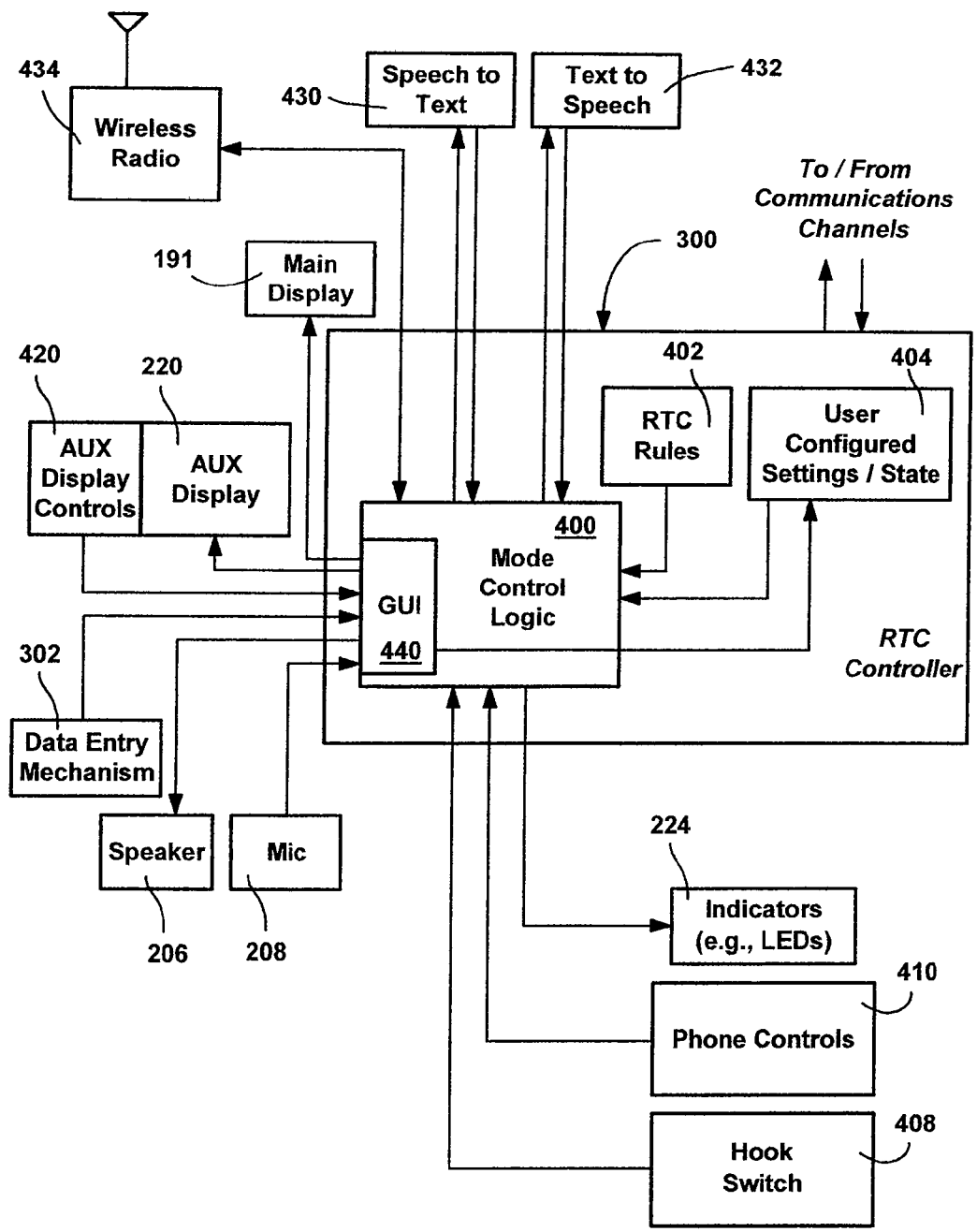
FIG. 4 is a block diagram generally representing components to couple various devices and control and display connection state in accordance with an aspect of the present invention.

In accordance with an aspect of the present invention, the real-time communications controller 300 controls the communication modes for the user, thereby removing much of the user's need to deal with device and connection considerations. As generally represented in FIG. 4, this is accomplished by responding to the user's actions, via mode control logic 400 in the real-time communications controller 300 that follows various real-time communication rules 402 and/or is based at least in part on other user-configurable settings and a current operating state 404. The mode control logic 400 likewise responds to external events, such as incoming calls, pages, text messages, forwarded voicemail messages, and so forth.

User actions can occur and be detected in any number of ways, and the present invention contemplates essentially any way of providing user action data or intended action data to a computer system. For example, such actions can include lifting or replacing the attached handset, which correspondingly actuates a hook switch 408 that is connected to the real-time communications controller 300, and thus can be detected as state data. Phone controls 410, such as in the form of buttons on a device such as a talk button or buttons on the keyboard or monitor, (e.g., a speakerphone button, a flash button, and so on) can similarly provide user action information, as can a PBX telephone 310 or other computing device/telephone 308 (FIG. 3) connected to the computer system. Controls 420 accompanying the auxiliary display 220, such as in the form of scroll buttons and possibly an enter or select button (or equivalent button elsewhere on the system such as the flash button), can also provide user action data, as can the computer data entry mechanisms 302 such as a keyboard and mouse. Any microphone, such as the microphone 208, can also provide user action data, e.g., via speech recognition (command and control) performed with a speech to text recognizer 430. Text may also be converted to speech by an appropriate converter 432, such as when the user enters text to leave a message, but instead actually leaves a voice message on a called device, e.g., when the logic 400 detects that forwarding text would not be appropriate. User action information may also be communicated by wireless radio 434, and/or from a network connection or other communication channel. Motion and/or proximity sensing can likewise serve as a user action sensor.

Where appropriate, a graphical user interface component 440 shown as part of the mode control logic 400 (but possibly anywhere in the computer system, such as in another application program) may facilitate entry of the user action information. For example, the user may interact with one of the displays to select a displayed telephone number for connecting or reconnecting with a person or device at that number.

The present invention similarly outputs information to the user in any feasible manner, including via the user interface when appropriate. Essentially, anything capable of outputting something that can be sensed by a user can serve as an output mechanism, including the displays 191 and/or 220, lights and other indicators 224, the speaker 206 or other audio generating device such as a ringer on a cell phone, and other mechanisms such as one that provides tactile feedback (e.g., a vibrating cell phone). Thus, as used herein, the term "display" is only an example, and is not limited to visible information, but can include any sensed output. For example, a hook indicator in the form of an LED may be configured to flash red to indicate an incoming call, be lit green when off hook, blink amber when the call is on hold, and blink on-and-off when a call is muted. A tone and pattern can "display" the same information audibly.

In keeping with the present invention, the related hook switch 408, controls 410, 420, displays 191 and 220 and indicators 224 provide additional value that is consistent with but go beyond a user's past communications experiences. To this end, the various controls and indicators are generally placed in proximity to the functions that they control and represent. Further, the various devices such as handsets, headsets, and speakerphones are already familiar to users, and the physical interfaces for these devices are largely equivalent to conventional devices.

Moreover, the present invention allows for various levels of computing skill. In general, the various control buttons 410, 420 and the hook switch 408 that are provided allow the user to take advantage of much of the real-time communications controller's functionality without ever having to operate the graphical user interface software 440. However, to accomplish more sophisticated operations as desired, a user can also connect via the user interface 440, e.g., to automatically dial calls, answer via a mouse click, customize settings and preferences and so forth.

In general, the logic 400 receives user action data or remotely communicated data (such as an incoming call), and based on various real-time communications rules 402 and user configurable settings 404, responds in a proper manner. For example, as described below, for an incoming call, the mode control logic 400 will display the caller ID information on the auxiliary display 220, or possibly the main display 191 if so configured by the user, sound a ring or call waiting tone on the speaker 206, and wait for a user action. If the user presses a phone control button such as a speakerphone button, the call will be connected to the appropriate device, e.g., routed to the speaker 206 and microphone 208. Any other audio, such as music that the user was listening to, may be automatically muted until the call is complete, e.g., until the user again presses the speakerphone button to disconnect.

The present invention thus automatically and transparently responds in an appropriate manner to a user's needs. By way of example, consider the example above of a user who is working at the computer when a call comes in. Instead of figuring out what type of call it is, finding the device necessary to (possibly) answer it, and so on, the user merely glances at the auxiliary display, decides whether to take the call, and if so, selects any appropriate device to answer. Because the real-time communications controller 300 is the center of communication, a call to any of the user's landline telephone devices or any (smart) cellular telephone will relay the caller ID data to the real-time communications controller 300, which will display that caller ID data displayed on the same auxiliary display 220 as any other call. For the same reason, the user can answer any incoming call on the speakerphone 304, the handset 204, the headset 306, the cellular telephone or mobile computing device 308 and so on. The user need not even know whether a given call came in on a given communications channel, such as the cellular channel instead of a POTS channel or network channel, although for reasons such as cost of airtime, the user may want to know this information. Regardless of the device and the channel, the user is provided access to a universal address book, call log, and inbox.

Moreover, the present invention allows a user to transition between communication channels. Thus, for example, a user who receives a POTS telephone call can answer talk for awhile, and switch that call over to a mobile phone to continue the conversation away from the computer system. Note that this is not conventional call forwarding set up in advance for switching at the central switching office or the like, but rather on-demand transitioning during a telephone call. For example, rules 402 can be set up to favor landline over cellular for local calls since there is no airtime charge, however long distance may be favored over cellular when there is no additional charge and the user is likely to have unused airtime before the next billing cycle. Voice over IP may be the most favored, but may not be available when the computer system is powered down.

One simple way to accomplish transitioning live connections is via a different telephone line relative to the source of the call. For example, if a user is leaving his or her office, the real-time communications controller 300 can transparently (or mostly transparently) establish a cellular connection to the user's mobile telephone device on that other line and connect the other caller to that mobile telephone device through the real-time communications controller 300. Voice over IP can similarly be used.

Three-way and conference calling capabilities can also be leveraged, e.g., a user can walk into his or her office while connected to another person via a cell phone, the real-time communications controller 400 can establish another call to the other party via a POTS, PBX or voice over IP call, and when connected, terminate the cellular phone call.

In addition to switching and transitioning among devices and channels, the present invention can switch and/or transition among types of communication. For example, a user can respond to a telephone call with an instant message, either automatically or by typing/speech recognition, e.g., to notify the caller that the call was received but could not be answered at that moment. In the event that the real-time communications controller 300 has the caller ID and/or other information from that call, possibly including preset knowledge such as that the incoming telephone number belongs to a mobile device, the real-time communications controller 300 can adjust the instant message as appropriate, e.g., convert a text message to speech to leave a voice message when the call was known to be from a mobile phone that does not handle text, or when the user is known to be traveling. Note that the instant message does not have to be sent to the same device that called the user, e.g., a user can respond to a received phone call from a conventional telephone with an instant message to the caller's computer system. A simple database lookup or the like by the mode control logic can provide the recipient's address from the caller ID data so that the user does not even have to enter this information.

As another type change, when available, the present invention can start with an audio call and add video (one-way or two-way) and/or instant messaging as desired by the parties, or start with an instant message and add audio and/or video. For example, a user can press a camera button, or select video via a mouse click, to establish a video connection and start transmitting video. A video call can similarly be transitioned to a non-video (e.g., audio-only) call. In general, the present invention facilitates switching and/or transitioning between any modes of communication. Transitioning between text, voice and video states is described below with reference to FIGS. 10-12.

It should be noted that the computer system need not be fully operational for communications to work in accordance with the present invention. Indeed, communications should still work when the computer is powered down, at least to a default extent or to an extent configured by a user, such as when the computer system is in a sleep state or a hibernate mode, and/or when the user is locked out of the system via security mechanisms. Note that the type and extent of communications may be configured by the user. For example, the user may want the telephone handset, speakerphone and caller-ID device to work as conventional appliances when the computer system is powered down, but not the camera, headset, or network card. Further, the user may limit the extent of the communications based on the computer system state, e.g., when the user is not logged in, the real-time communications controller 300 may be set to block long distance calls, block calls to a certain prefix, and so forth.

To enable and control communications in these powered down modes, the real-time communications controller 300 may be loaded into executable non-volatile memory, operated with a secondary processor, and so forth, so that communications work as long as some power is available, even though the disk, main processor, main display, network card and/or other parts of the system are powered down.

Figure 5:
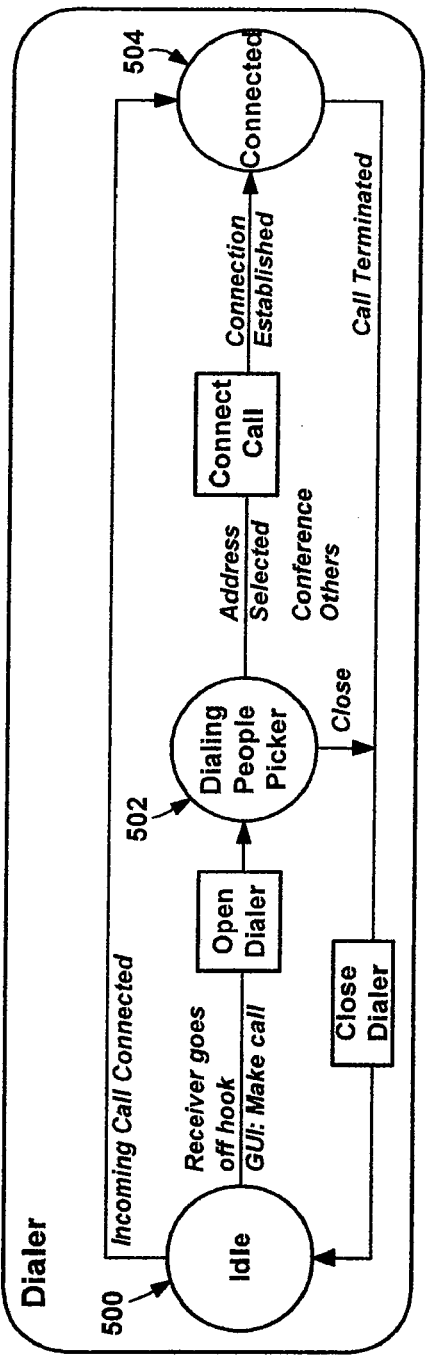
FIG. 5 is a state diagram generally representing a dialer object and related operation in accordance with an aspect of the present invention.

Turning to an explanation of the operation of the present invention with particular reference to the mode control logic 400, FIGS. 5-8 represent general logic and rules in the form of state diagrams for various objects that control behavior of the various mechanisms. For example, FIG. 5 shows the logic and rules for connecting a call when initiating the call via a dialer object or the like. As represented in FIG. 5, when starting in an idle state 500, the user will send a dial request to line device (FIG. 7). In the event that the computer system is not powered-down, a dialer program may be automatically displayed on the graphical user interface (GUI) on the main display 191, from which the user may enter a state where the user can select a person to call or close the dialer, or the user may dial (or hang-up) in a conventional fashion. A user may also be able to scroll through and select a number on the auxiliary display 220, such as to call a number from a list of calls logged via caller ID information, speak a name or number into a microphone, press a speed dial button and so on. If dialed in any manner, the logic will attempt to connect the call, and if successful, the system will end up in a connected state 504 until terminated.

FIG. 5 also shows that a call answered (in any manner) when in the idle state 500 goes directly to the connected state 504. More particularly, a pick-up request is sent to the line device (FIG. 7). If no receiver is active/off hook, a default (which may be user-configurable) receiver is selected as the active receiver, and the audio stream is sent to that active receiver. The call event may be logged in the system.

When connected, if the connection supports video and a video camera is present and its use is allowed, video is streamed. A user may disallow video by closing the camera's shutter, or by configuring the system to not automatically allow video, that is, only allow video if some manual user action is detected. The user can see when an incoming call supports video and can answer the call immediately in that mode, such as by pressing a camera button. Optionally, the user can set a preference so that the camera is automatically enabled whenever answering a call that supports video.

If the connection supports text or rich ink messaging, an embedded instant messenger (IM) chat control is also enabled. If an indicator serves as a "connection" light, i.e., to indicate when a communication link is established between two users, then the indicator may also indicate when an IM connection is active, such as by a different LED behavior (e.g., color and/or flash pattern) with respect to a voice-only call, to communicate to the user that an IM connection exists.

Figure 6:
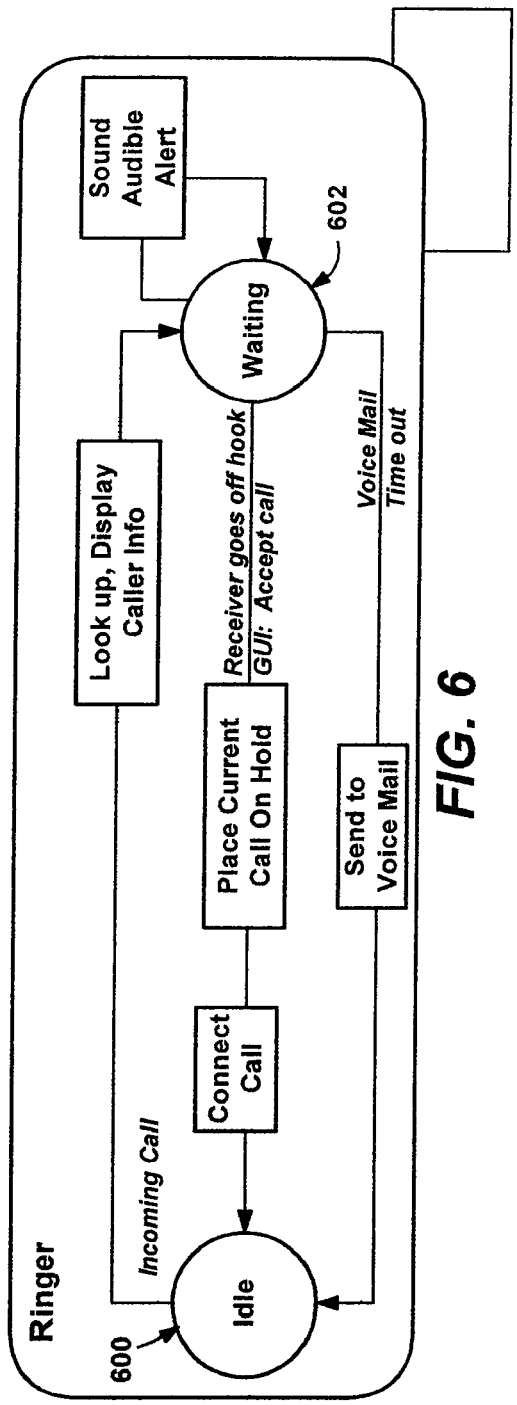
FIG. 6 is a state diagram generally representing a ringer object and related operation in accordance with an aspect of the present invention.

FIG. 6 shows other operation of the logic 400, such as with respect to an object that controls a ringer or other suitable notification mechanism when an incoming call is received. When in a ringer idle state 600, (which means idle with respect to notifying a user of a new incoming call, and may include a state in which a user is already on a current call), the logic 400 will look up and display the new caller information and enter a waiting state 602. For example, the waiting call may be displayed via a side bar notification fly-out if the main display is on, and/or may be displayed on the auxiliary display device. At that time, the logic 400 also may sound an audible alert (and/or providing another suitable notification, such as flashing an LED and/or vibrating a device). The type of alert may depend on whether the user is on another call or on other state information, e.g., if in a Do Not Disturb mode, no sound is played, else if no receiver is active, a ringing sound is played, otherwise a receiver call waiting tone is played.

If the active receiver goes off hook or is clicked, a flash button or the like is pressed, or the user requests that the call be answered via the graphical user interface, the ringer leaves the waiting state 602 when the call is connected, after placing any current call on hold. A conference button or the like (not shown) can add the caller to an existing call. If no action is taken to connect the call, a voice mail time out will send the call to voice mail and return the ringer to the idle state with respect to further incoming calls.

FIG. 7 shows the operation of the line device object in an idle state 700, a waiting state 702, a connecting state 704 and a connected state 706. In general, these states have been previously described above in slightly different context, and will thus not be repeated herein except to note that while attempting to establish a connection as represented by state 704, a connecting status or the like may be displayed by the line device object, during which time the user can cancel the attempt. Also, a hold request can transition the user from the connected state 706 to a waiting state 702 by placing the line on hold, while a pick-up request works in the opposite way, by connecting the line. Also, not shown in FIG. 7, multimedia playback may be turned off or muted while any receiver is active, and restored when no receiver is active.

Figure 9:
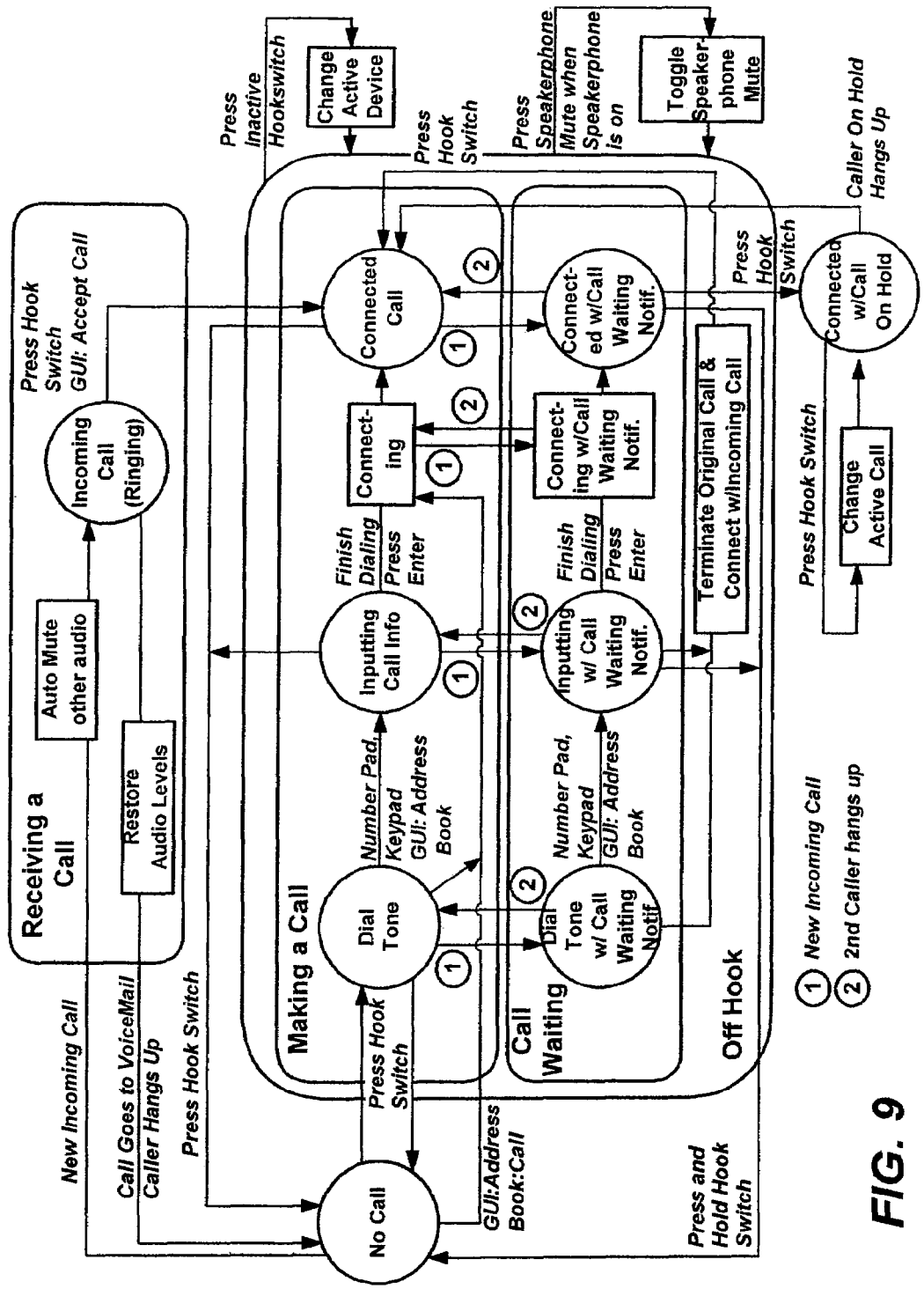
FIG. 9 is a general state diagram representing states of operation when making a call, receiving a call, and when a call is waiting, in accordance with an aspect of the present invention.

FIG. 8 represents the operation of a phone device object in an idle state 800, and in two off hook states, a normal state 802 and a muted state 804. The transitions between the states are readily apparent in FIG. 8, although it should be noted that as described above, another receiver can be set as the active receiver without disconnecting the line. For example, selecting a speakerphone logically hangs-up an active handset or headset, picking up the handset turns off the speakerphone or headset, pressing a talk button on the headset turns off the speakerphone or handset, and so forth. FIG. 9 represents a general overview of the logic 400 that summarizes various states of operation. For example, as represented in FIG. 9, the hook switch operates in a number of ways, including using it to terminate a call, lifting it to make a receiver active and pick up waiting line, as a flash button to switch lines or terminate a call if no lines are waiting. The hook switch may be implemented as a cradle hook switch mechanically integrated into the handset cradle, comprising a two-position toggle switch that closes when the handset is off hook and opens when the handset is in the cradle.

In general, as represented in FIG. 9 lifting the handset from the cradle usually takes the handset off hook and displays a dialog box for selecting the person to call. During a call, replacing the handset in the cradle will hang up the call. If the handset is not the active receiver during a call, lifting the handset from the cradle will make the handset the active receiver, switching off the old active receiver (e.g., the speakerphone or headset). When the phone is ringing from an incoming call, lifting the handset will answer the call, taking the handset off hook. If the phone is ringing while another phone conversation is already in progress, depressing the cradle hook switch quickly will toggle between the two calls, like flashing the hook switch will do with call waiting present on a legacy phone system. A talk button, usually integrated into the keypad of telephone devices, such as a headset or handset, performs similar functionality to the hook switch and can generally be considered similar to the hook switch operation in FIG. 9. In general, either a talk button or cradle hook switch (or at least a graphical user interface equivalent) is required for each phone handset or headset. The talk button comprises a single-throw, momentary switch that toggles the hook state for a telephone receiver. Its primary function is to initiate or answer a call, and then hang up when the conversation is finished. During a call, pressing a talk button on the active receiver will hang up the call. Pressing the talk button on another receiver will have the effect of making it the active receiver, switching off the old active receiver (handset or headset). When the phone is ringing from an incoming call, pressing the talk button will answer the call, taking the receiver off hook. If the phone is ringing while another phone conversation is already in progress, pressing the talk button will toggle between the two calls.

FIG. 9 also shows various operations via a speakerphone button similarly comprising a single-throw, momentary switch to toggle the hook state for a speakerphone. Its primary function is to initiate or answer a call, and then hang up when the conversation is finished. The speakerphone button is a special case of the talk button, used where the incoming call is broadcast over a speaker and audio is collected via a far field microphone. In a cordless handset with speaker phone capabilities, it may be important to indicate to the user that the speakerphone is active to differentiate it from the handset talk switch.

If a virtual speakerphone is implemented using the microphone and speakers that are already part of the PC system, a speakerphone button may be located on the keyboard, e.g., to the left of the main keyboard keys. This button usually takes the PC speakerphone off hook and displays a dialog box for selecting the person to call. During a call, pressing the speakerphone button when the speakerphone is the active receiver will hang up the call. If the speakerphone is not the active receiver, this will have the effect of making it the active receiver, switching off the old active receiver. When the phone is ringing from an incoming call, pressing the speakerphone button will answer the call, taking the speakerphone off hook. If the phone is ringing while another phone conversation is already in progress, pressing the speaker phone button will toggle between the two calls like flashing the hook switch.

Because the talk button or speakerphone button state may not be readily apparent to a user, a hook indicator may be used in conjunction with a talk or speakerphone button, and, for example, may be located adjacent or integrated into the talk button or speakerphone button. The hook indicator may indicate state via various colors and flash patterns, e.g., steady state unlit when the receiver is on hook, steady state green when the receiver is off hook, or steady state red when no service is available. A flashing indicator, such as with a "wink" duty cycle can overlay the steady state, e.g., a red wink overlay can indicate call waiting, or an amber flash overlay can indicate a call holding. The call waiting overlay indicator will continue to blink as long as the user can pick up the phone to connect to the incoming caller, even if the call is no longer ringing. This allows call screening when callers are recording voice mail. The call holding overlay is generally only needed when a dedicated hold indicator is not present.

Although not specifically represented in FIG. 9, other buttons may be provided. For example, a flash button, often used for alternate line selection, generates a momentary on hook condition for signaling purposes. When the user is notified of a call waiting, pressing the flash button will place the current call on hold and answer the incoming call. With calls on hold, pressing the flash button places the current call on hold and picks up the next call in the hold queue. A hold button places a current call on hold by placing the current call into a call waiting state as generally represented in FIG. 7, freeing the receiver to make another call, answer an incoming call, or hang up to pick up on another receiver. A conference button initiates a conference call, in which pressing the conference button joins the current call with one or more calls waiting on hold. Other buttons are feasible, such as a button to immediately send an incoming call to voice mail. Note that because the real time communications controller 300 handles the calls, conference calls can also be handled via the graphical user interface 440, e.g., additional contacts or groups of contacts can be clicked and dragged to a window to conference in others.

FIG. 9 also represents a number of user interaction scenarios with respect to real-time communications, including handling an incoming call and making a call. As described above, to make a phone call, the user lifts the handset or presses the talk switch on the speakerphone or headset, and then dials a number. Alternatively, the user may select a contact from the display 220 or graphical user interface 440, or employ voice dialing. When initiating a call from the graphical user interface 440, such as within the context of a communications application such as Microsoft® Outlook, the user can initiate a phone call from any standard contact object supported by an API. The operating system takes the default receiver off hook and makes the connection using a preferred or specified telecommunications service.

To answer a phone call, the user lifts the handset, presses a speakerphone switch, or presses a talk switch headset (or on the speakerphone). Before answering, the user has the ability to view caller ID, and possibly other pertinent contact information displayed with the notification message (on the main display or auxiliary display), allowing the user to pre-screen the call. Depending on preferences, the user can then choose to pick up the call or transfer it to voice mail, which may include transferring it to one of a plurality of custom or standard voice mail messages. While the caller is recording voice mail, the user can monitor the incoming recording and pick up the receiver, similar to a traditional answering machine.

The examples below provide additional interaction detail for common telephony functions, including an incoming call scenario, wherein the real-time communications controller sounds the ringer and blinks the talk button indicator, while using caller ID information to display contact information. When the user presses the talk button, a microphone button, camera button, or picks up the handset, or presses the hook (talk) switch on the headset, the real-time communications controller 300 may light an indicator for the active receiver. The user receives the call, and can switch among devices, e.g., to switch to the speakerphone, the user presses the talk button or mic button; to switch to the video speakerphone, the user presses the camera button; to switch to the handset, the user picks it up (activating the hook switch); or to switch to the headset, the user presses the hook (talk) switch on the headset. A cell phone or mobile computing device may be similarly used, even without actually switching the call to the cellular network (which may require some additional user action). When the user switches active receivers, the system disables the previous receiver to prevent feedback, and updates indicators to reflect the active receiver.

If the call supports video, the real-time communications controller blinks the camera indicator. If the user presses the blinking camera button, or automatic video is set by user preference to automatically stream video when video is available, the system opens the video monitor, lights the camera indicator, and starts streaming video.

To mute a component, the user can take an appropriate action. For example, to mute video and audio, the user presses the camera button, whereby the real-time communications controller blinks the audio and video indicators until the camera button is pressed again or the call is terminated. To mute video only, the user shuts the camera's privacy shutter, whereby the system un-lights the video indicators and closes the A/V monitor, but maintains the audio indicator. To mute speakerphone audio, the user presses the microphone (speakerphone) button, whereby the real-time communications controller blinks an appropriate indicator until the button is pressed again or the call is terminated. To hang up, the user presses the hook switch for the active receiver.

To place a call, the real-time communications controller 300 reacts when the user presses the talk button, picks up the handset, or presses the hook switch on headset, by displaying a dialog box for selecting the person to call. The system may also audibly ask through the active receiver, such as when voice dialing is enabled, as to who the user would like to call. The real-time communications controller uses resulting input to select a contact from the dialog box, and the user can query to search and can re-query to refine the search, if necessary.

When the user makes a selection or acknowledges a match, the real-time communications controller shows contact information for the selected recipient and shows a status dialog box while the call is connecting. When connected, the user can switch devices as described above, and also switch modes, e.g., audio to video, and so forth, with the indicators operating in the above-described manner.

The user can also perform other communications-related tasks, including checking voice mail and call screening. For example, an indicator light may blink to indicate a voice mail, whereby the user can user press a notification button causing the real-time communications controller to enter a callback routine for the highest priority notification. In case of voice mail or priority email, this may open the user's unified In Box. Call screening logic follows various rules, including showing caller ID information and contact summary data until, after a preset number of rings, the system stops the ringer and sends a voice mail message to an incoming caller. If the call screening option is enabled, the system echoes the incoming message to a system audio output device (usually the speaker). If the user presses the hook switch of any receiver, the system discards the message and switches to real-time voice, otherwise, when the user hangs up or after a certain time limit, the system stops blinking the talk button indicator and files a voice message.

Figure 10:
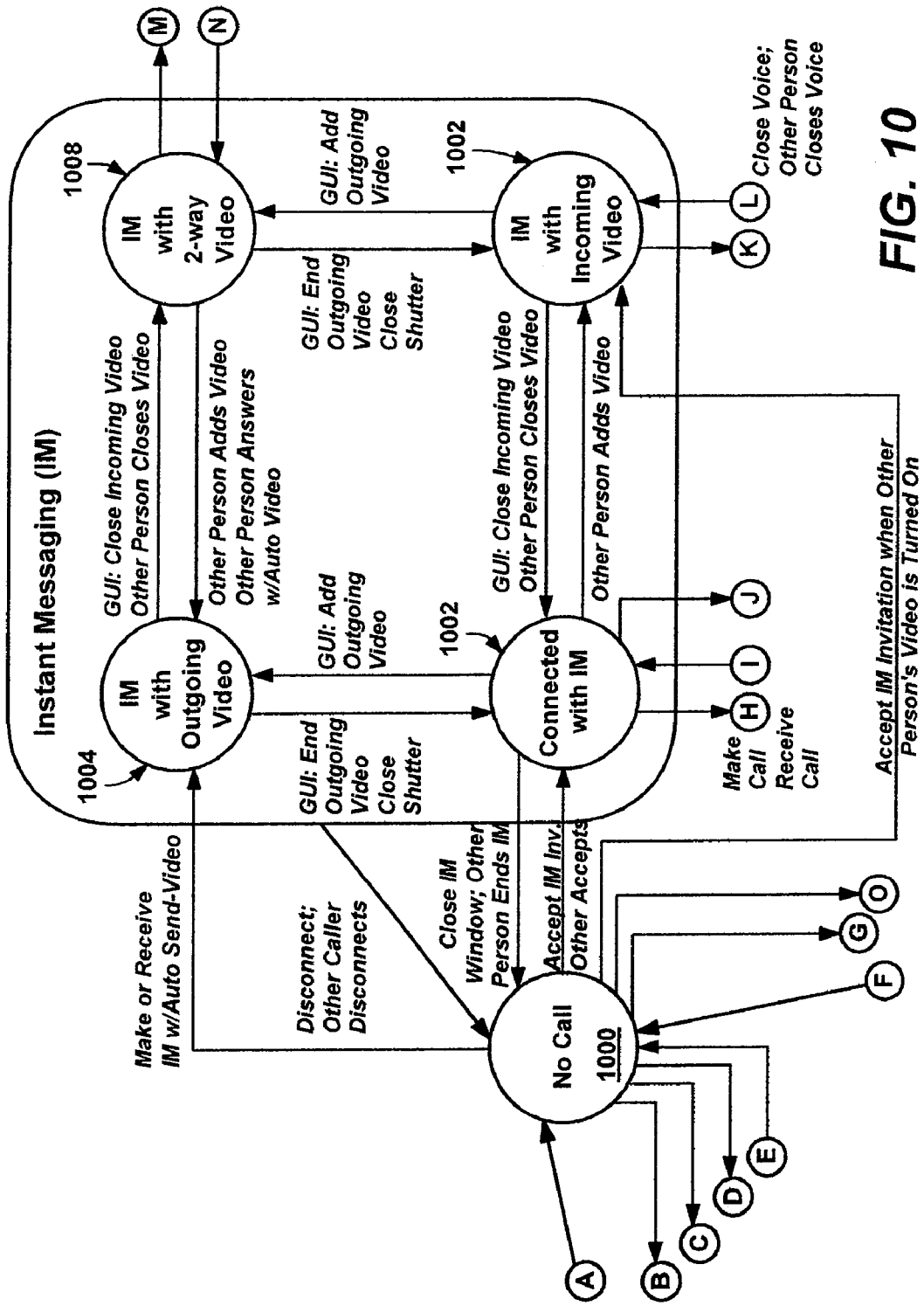
FIGS. 10-12 comprise a state diagram representing the transitions between instant messaging, voice and video states in accordance with an aspect of the present invention.
Figure 11:
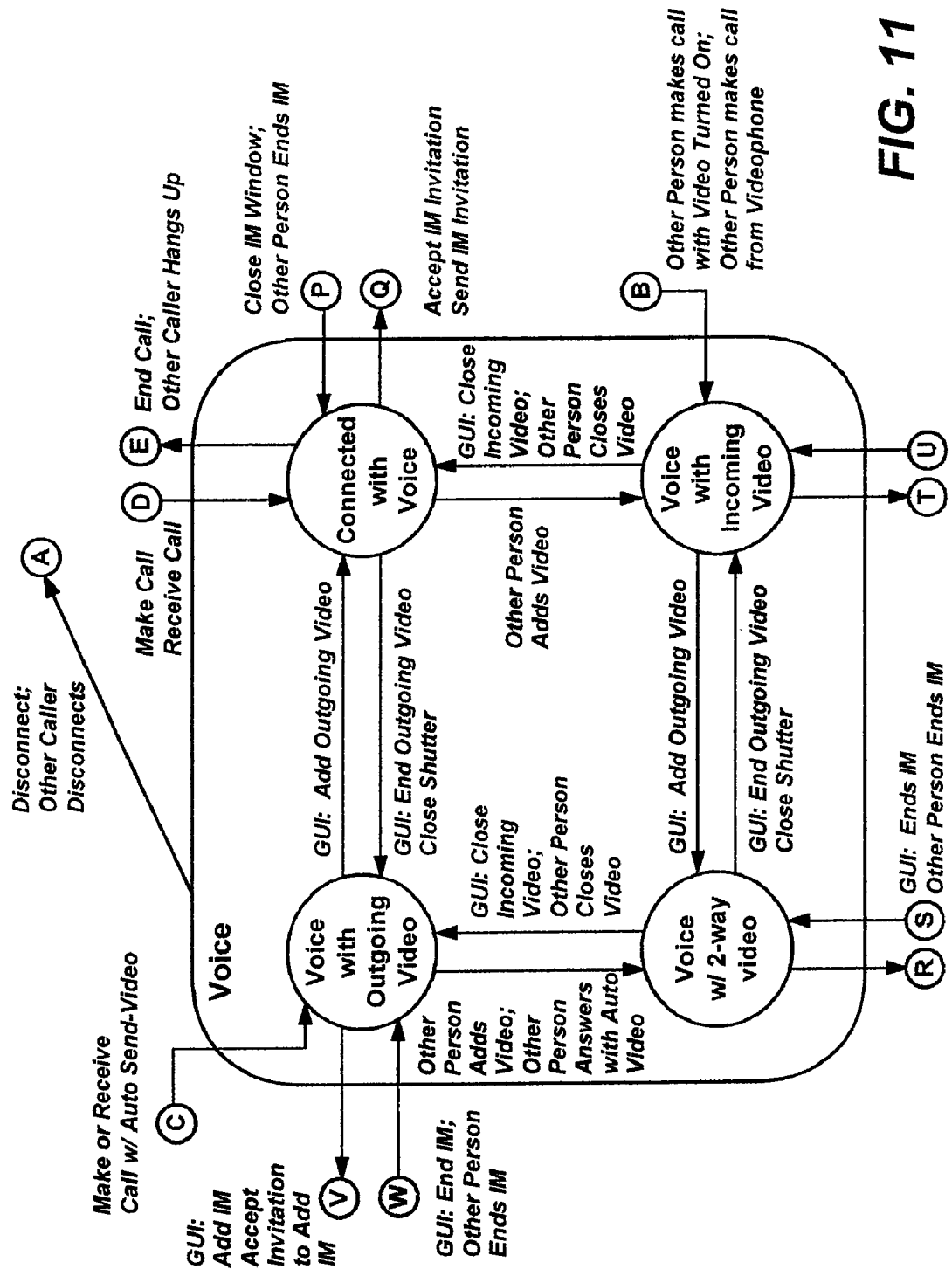
Figure 12:
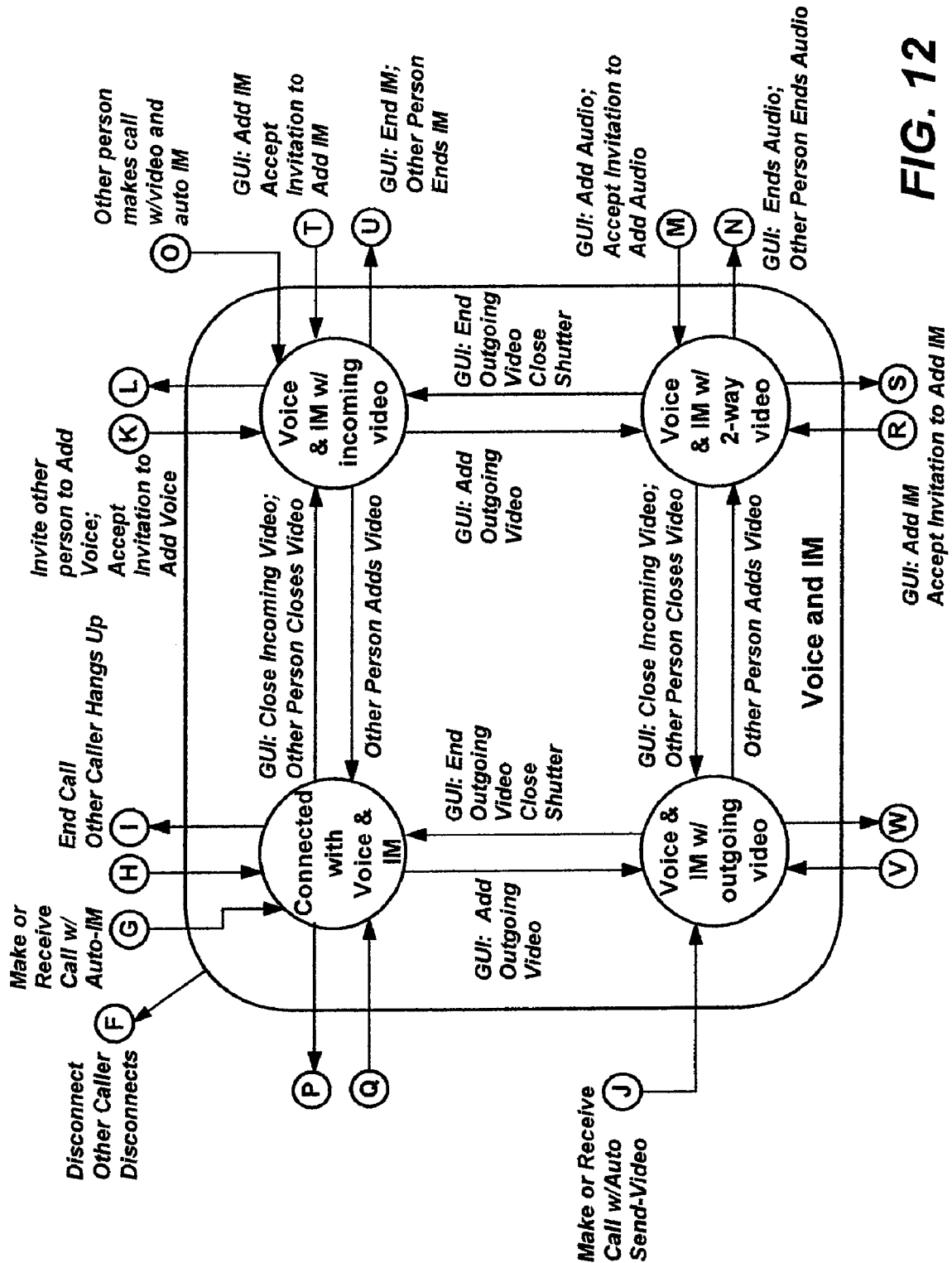

FIG. 10-12 generally show the relationships between instant messaging, and/or voice communication states, with various incoming and/or outgoing video states, and the various channel switching transitions between these states. Note that although instant messaging is used as an example in FIG. 10, any other type of real-time text messaging is equivalent, including text messages sent to pagers, and possibly electronic mail if relatively fast enough to be considered real-time. One state represented in FIG. 10 is a no call state 1000 than can transition to various voice and/or instant messaging states. As also represented in FIGS. 10-12, the connected states can have automatic video active, or video can be added (or ended) at any time by either party.

FIG. 10 represents the instant messaging states without voice, including a state with no video 1002, and states with incoming, outgoing and two-way video, states 1004, 1006 and 1008, respectively. As is readily apparent, each user controls these states by user actions or configured preferences for automatic video operation. Note that voice can be added from these states, in which event a new state will be entered as represented in FIG. 12.

FIG. 11 represents the voice without instant messaging states, with similar video-related states of voice only, incoming, outgoing and two-way video, states 1004, 1006 and 1008, respectively. Note that instant messaging can be added from these voice states, in which event a new state will be entered as represented in FIG. 12.

FIG. 12 represents the states and transitions when both instant messaging and voice are active, with transitions within the same four possible video-related states of none, incoming, outgoing and two-way video available. As can be seen in FIG. 12, the communication may transition to a no instant messaging state (FIG. 11) or no voice state (FIG. 10), or no communication at all at state 1000 of FIG. 10, based on straightforward actions of the users who are communicating.

Figure 13:
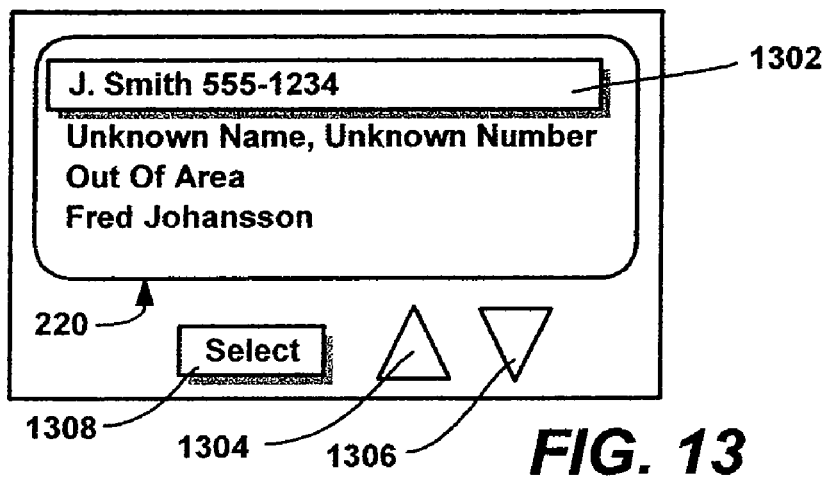
FIGS. 13-15 are representations of an example display which allows non-linear selection of calls displayed based on caller ID information.

In accordance with another aspect of the present invention, there is provided a caller ID navigation mechanism that allows users to navigate a stack of calls in a non-linear manner. As represented in FIG. 13, the available calls may be displayed on the auxiliary display device 220, with the currently connected call 1302 indicated in some manner to differentiate it from the calls on hold. As can be appreciated, richer information may be provided depending on the amount of display area available, such as the length of time the user was on hold, the type of connections that are available and its current state (voice, video, instant message) and so forth.

Figure 14:
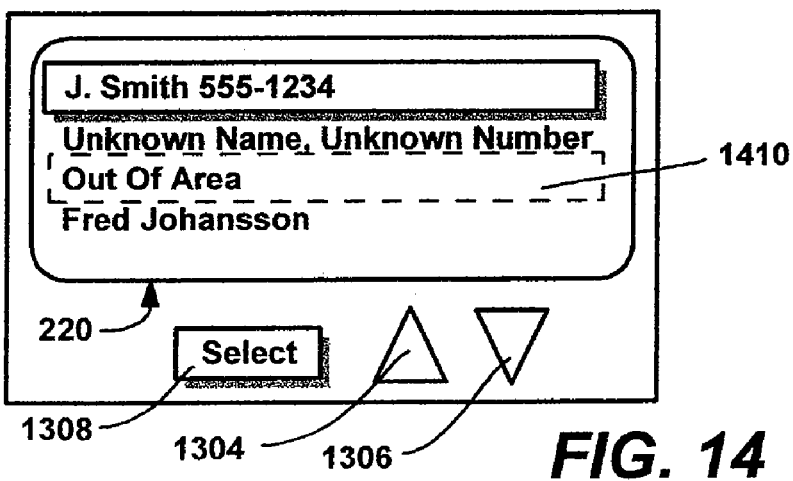
Figure 15:
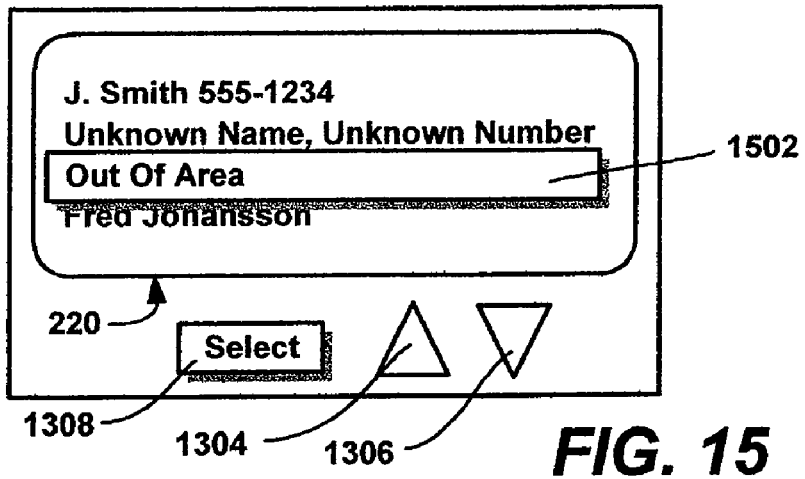

In general, the user presses the scroll buttons 1304 and 1306 to navigate to a call, such as represented by the dashed box 1410 in FIG. 14, and presses a select button 1308 to switch to the call, as represented by the connected box 1502 moving relative to its position in FIG. 13. Because the real-time controller 300, and not a remote switch at the telephone is in charge, the switching may be non-linear. Note that the scroll buttons are typically near or part of the auxiliary display unit because the user will be looking at the display, however the select button 1308 may be another button located elsewhere, such as a flash button on the keyboard, (as long as that button remains active while the computer system is otherwise in a powered off state).

Further, if the main display is active, the user need not scroll, but can instead simply select a call to switch two via a point and click operation. Of course, the user can also scroll, such as via keyboard cursor keys to highlight, and the Enter key to select. Again, richer information may be provided, particularly since the main display 191 will provide more display area relative to the auxiliary display 220.

As represented in FIGS. 16 and 17, (which shows a richer set of information), depending on the available buttons and their meaning, conferencing by selecting users is also feasible. For example, holding the select button while on a connected call, and then scrolling through the list view, can keep any existing connections connected, and releasing the select button can add (or drop if already selected) another user. On the main display, more elaborate schemes are available, e.g., to drag and drop other parties into a "connected" window, right click on a list view similar to that shown in FIGS. 16 and 17, and so forth.

As can be seen from the foregoing detailed description, there is provided a real-time communications method and system for handling the switching and transitioning between communications modalities including switching devices, switching communication channels and/or transitioning types of communications, e.g., audio, video and text. The present invention facilitates user communication by blurring the distinction between these various modalities, allowing the user to focus on the communication rather than the mechanisms for accomplishing the communication. The method and system thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for automatically switching a call from a communication device that is being used in a call to a different communications device, the method comprising:

a call management module receiving a call from an initiating communication device, the call directed to an identifier associated with a call participant;

the call management module establishing a first connection to a first recipient communication device associated with the call participant and being configured to communicate on a first communication network, the first connection being over the first communication network;

the call management module coupling the received call from the initiating communication device to the first recipient communication device over the established first connection to the first recipient communication device;

the call management module receiving an indication from the first recipient communication device of the call participant indicating that continuation of the call is to be transitioned from the first recipient communication device to a second, different recipient communication device associated with the call participant;

in response to the received indication, the call management module automatically establishing a second connection to the call participant's second recipient communication device while the first connection remains coupled between the initiating and first recipient communication devices, the second communication device configured to communicate on a second network different from the first communication network, the second connection being over the second communication network;

the call management module automatically transitioning the coupling of the received call from the initiating communication device to the second recipient communication device over the established second connection to the second recipient communication device, the transitioned coupling allowing the call participant to participate in the call using the second recipient communication device; and in response to the indication, the call management module automatically decoupling the call over the first connection from the first recipient communication device subsequent to transitioning the coupling of the call over the second connection to the second recipient communication device.

2. The method of claim 1, wherein the first recipient communication device comprises a POTS telephone and the second recipient communication device comprises a wireless communication device.

3. The method of claim 1, wherein the first recipient communication device comprises a POTS telephone and the second recipient communication device comprises a video communication device.

4. The method of claim 1, wherein the first recipient communication device comprises a POTS telephone and the second recipient communication device comprises a voice over internet protocol (VOIP) communication device.

5. The method of claim 1, wherein the first recipient communication device comprises a wireless communication device and the second recipient communication device comprises a POTS telephone.

6. The method of claim 1, wherein the first recipient communication device comprises a wireless communication device and the second recipient communication device comprises a video communication device.

7. The method of claim 1, wherein the first recipient communication device comprises a wireless communication device and the second recipient communication device comprises a VOW communication device.

8. The method of claim 1, wherein receiving the call comprises detecting an incoming text message.

9. The method of claim 1, wherein receiving the call comprises detecting an incoming Internet Protocol-based call.

10. The method of claim 1, wherein the received indication from the call participant comprises a voice command.

11. The method of claim 1, further comprising displaying caller ID information corresponding to the initiating communication device to notify the call participant of an incoming caller's identity.

12. The method of claim 1, further comprising changing the type of the call from POTS to video phone call.

13. The method of claim 1, further comprising:
the call management module receiving an indication from the call participant indicating that continuation of the call is to be transitioned from the second recipient communication device to a third recipient communication device associated with the call participant;
in response to the received indication, the call management module automatically establishing a third connection to the call participant's third recipient communication device while the second connection remains coupled between the initiating and second recipient communication devices, the third communication device configured to communicate on a third network different from the second communication network, the third connection being over the third communication network;
the call management module automatically transitioning the coupling of the received call from the initiating communication device to the third recipient communication device over the established third connection to the third recipient communication device, the transitioned coupling allowing the call participant to participate in the call using the third recipient communication device; and
in response to the indication, the call management module automatically decoupling the call over the second connection from the second recipient communication device subsequent to transitioning the coupling of the call over the third connection to the third recipient communication device.

14. A computer-readable storage medium having stored thereon computer-executable instructions that, when executed by one or more processors of a computing system, cause the computing system to perform the method of claim 1.

15. A computer system including an initiating communication device, a call management module and at least one recipient communication device, the system for automatically switching a call from a communication device that is being used in a call to a different communications device, the system comprising a call management module configured to:
receive a call from an initiating communication device, the call directed to an identifier associated with a call participant;
establish a first connection to a first recipient communication device associated with the call participant, wherein the call management module is configured to communicate on a first communication network, the first connection being over the first communication network;
couple the received call from the initiating communication device to the first recipient communication device over the established first connection to the first recipient communication device;
receive an indication from the first recipient communication device of the call participant indicating that continuation of the call is to be transitioned from the first recipient communication device to a second, different recipient communication device associated with the call participant;
in response to the received indication, automatically establish a second connection to the call participant's second recipient communication device while the first connection remains coupled between the initiating and first recipient communication devices, the second communication device configured to communicate on a second network different from the first communication network, the second connection being over the second communication network;
automatically transition the coupling of the received call from the initiating communication device to the second recipient communication device over the established second connection to the second recipient communication device, the transitioned coupling allowing the call participant to participate in the call using the second recipient communication device; and
in response to the indication, automatically decouple the call over the first connection from the first recipient communication device subsequent to transitioning the coupling of the call over the second connection to the second recipient communication device.

16. The system of claim 15, wherein the call management module is further configured to:
receive a call from the first recipient communication device, the call directed to an identifier associated with a second call participant;
establish a third connection to a third recipient communication device associated with the second call participant, wherein the call management module is configured to communicate on a third communication network, the third connection being over the third communication network;
couple the received call from the first recipient communication device to the third recipient communication device over the established third connection to the third recipient communication device;
receive an indication from the second recipient communication device of the second call participant indicating that continuation of the call is to be transitioned from the third recipient communication device to a fourth, different recipient communication device associated with the second call participant;
in response to the received indication, automatically establish a fourth connection to the call participant's fourth recipient communication device while the third connection remains coupled between the first recipient communication device and the third recipient communication device, the fourth communication device configured to communicate on a fourth network different from the third communication network, the fourth connection being over the fourth communication network;

automatically transition the coupling of the received second call from the first recipient communication device to the fourth recipient communication device over the established fourth connection to the fourth recipient communication device, the transitioned coupling allowing the second call participant to also participate in the call from the initiating communication device to the first recipient communication device using the fourth recipient communication device; and in response to the indication, automatically decouple the call over the third connection from the third recipient communication device subsequent to transitioning the coupling of the call over the fourth connection to the fourth recipient communication device.

17. The system of claim 15, further comprising displaying received call information on a user interface coupled with the call management module.

18. The system of claim 15, wherein the third recipient communication device comprises a POTS telephone and the fourth recipient communication device comprises a wireless communication device.

19. The system of claim 15, wherein the third recipient communication device comprises a POTS telephone and the fourth recipient communication device comprises a VOIP communication device.

20. In a computing environment, a method for automatically switching a call from a communication device that is being used in a call to a different communications device on a different network, the method comprising:

a call management module receiving a call from an initiating communication device, the call directed to an identifier associated with a call participant;

the call management module establishing a first connection to a POTS telephone associated with the call participant and being configured to communicate on a POTS telephone network, the first connection being over the POTS telephone network;

the call management module coupling the received call from the initiating communication device to the POTS telephone over the established first connection to the POTS telephone;

the call management module receiving an indication from the POTS telephone of the call participant indicating that continuation of the call is to be transitioned from the POTS telephone to a digital wireless telephone associated with the call participant;

in response to the received indication, the call management module automatically establishing a second connection to the call participant's digital wireless telephone while the call remains coupled between the initiating device and the POTS telephone, the digital wireless telephone being configured to communicate on a digital wireless network different from the POTS telephone network, the second connection being over the digital wireless communication network;

the call management module automatically transitioning the coupling of the received call from the initiating communication device to the digital wireless telephone over the established second connection to the digital wireless telephone, the POTS telephone and the digital wireless telephones being configured to communicate on separate communication networks, the transitioned coupling allowing the call participant to participate in the call using the digital wireless telephone; and in response to the indication, the call management module automatically decoupling the call over the POTS telephone network from the POTS telephone subsequent to transitioning the coupling of the call over the digital wireless network to the digital wireless telephone.

* * * * *